United States Patent [19]

Berends et al.

[11] Patent Number: 5,012,914

[45] Date of Patent: May 7, 1991

[54] DIVERTER ASSEMBLY FOR ARTICLE CONVEYOR

[75] Inventors: Howard Berends, Fruitport, Mich.; Thomas L. Garzelloni, Worth, Ill.

[73] Assignee: Automotion, Inc., Worth, Ill.

[21] Appl. No.: 425,427

[22] Filed: Oct. 23, 1989

[51] Int. Cl.⁵ .............................................. B65G 47/46
[52] U.S. Cl. ................................. 198/372; 198/782; 198/784; 198/789
[58] Field of Search ............... 198/362, 366, 372, 782, 198/784, 786, 787, 789, 369

[56] References Cited

U.S. PATENT DOCUMENTS

| | | | |
|---|---|---|---|
| 1,831,508 | 11/1931 | Quinn | 198/782 |
| 3,910,402 | 10/1975 | Dean | 198/782 X |
| 4,372,435 | 2/1983 | Bradbury | 198/782 X |
| 4,399,675 | 8/1983 | Erdmann et al. | 198/782 X |
| 4,696,386 | 9/1987 | Lem | 198/782 X |
| 4,746,003 | 5/1988 | Yu et al. | 198/372 X |
| 4,913,277 | 4/1990 | Zörgiebel et al. | 198/782 X |

FOREIGN PATENT DOCUMENTS

| | | | |
|---|---|---|---|
| 2335874 | 1/1975 | Fed. Rep. of Germany | 198/782 |
| 0056202 | 3/1987 | Japan | 198/782 |

Primary Examiner—D. Glenn Dayoan
Attorney, Agent, or Firm—Wood, Phillips, Mason, Recktenwald & VanSanten

[57] ABSTRACT

An article conveyor having a frame, a first conveyor with opposite sides for conveying articles in an first path, a wheel mounted to the frame for rotation relative thereto about a first axis and having an article engaging surface which advances articles as an incident of rotation of the wheel, structure for rotating the wheel about the first axis, and structure for selectively changing the orientation of the wheel and first axis between (a) a first position wherein the wheel advances articles engaged thereby in the first path and (b) a second position wherein the wheel advances articles engaged thereby in a second path that is transverse to the first path to thereby divert articles off of the first conveyor.

21 Claims, 3 Drawing Sheets

DIVERTER ASSEMBLY FOR ARTICLE CONVEYOR

BACKGROUND OF THE INVENTION

1. Field of the Invention

This invention relates to article conveyors and, more particularly, to a conveyor with structure for selectively diverting articles out of a main conveying stream.

2. Background Art

Diverters for articles on conveying structures are well known. It is common to provide a principal conveyor, which may employ an endless belt or driven rollers, to advance articles along a principal conveying path and one or more secondary conveyors, which branch off from the principal conveyor path. Through sometimes relatively sophisticated control systems, articles are selectively diverted out of the main conveying path to the secondary conveyors, which deliver the sorted articles to a desired location.

Heretofore, the article diverting structure has taken a number of different forms. One exemplary system utilizes pushers mounted on article carrying tubes for sliding movement lengthwise of the tubes. The tubes move in an endless path tranverse to their length. The pushers have depending guide elements which extend between the tubes to cooperate with a track system that controls lateral pusher movement as the conveyor operates. This pusher system has proven very successful in operation.

Another type of diverter system employs a plurality of rollers which are elevated during operation to engage desired articles and advance them out of the main conveying stream. The problem with this type of system is that it is quite complicated and consequently expensive from a manufacturing standpoint Further, as systems become more complicated, they are inherently more prone to failure.

This latter system requires at least two separate, interacting systems—one to convey in the principal conveying direction and at least one to divert Intricate control systems are required to time the elevation and operation of the divert structure.

Another problem with the latter system is that if it is desired to divert articles selectively off of either side of a main conveyor over the same conveyor length, more than one divert system is required. That is because each divert system is capable of only one conveying direction. The designer is then faced with the complicated task of fitting three independently operable conveying mechanisms in the same area, where space is at a premium.

Further, the divert mechanism(s) must also be geared differently than the main conveying structure, by a potentially complicated mechanism, so that the articles are rapidly diverted out of the main conveying stream and do not interfere with upstream articles.

SUMMARY OF THE INVENTION

The present invention is specifically directed to overcoming the above enumerated problems in a novel and simple manner.

According to the invention, an article conveyor is provided consisting of a frame, a first conveyor with opposite sides for conveying articles in a first path, a wheel mounted to the frame for rotation relative thereto about a first axis and having an article engaging surface which advances articles as an incident of rotation of the wheel, structure for rotating the wheel about the first axis, and structure for selectively changing the orientation of the wheel and first axis between (a) a first position, wherein the wheel advances articles engaged thereby in the first path and (b) a second position, wherein the wheel advances articles engaged thereby in a second path that is transverse to the first path, to thereby divert articles off of the first conveyor.

Accordingly, one mechanism can be used both to convey articles in the main conveying direction and to divert articles off of the main conveying structure, thereby simplifying the overall system.

Structure is provided to rotate the wheel at a first velocity with the wheel in the first position and a second velocity, different than the first velocity, with the wheel in the second position. Preferably, the wheel in its second position rotates more rapidly than in the first position so that articles are rapidly diverted off of the main conveyor to avoid interference with upstream articles.

Preferably, the wheel is rotated by a drive shaft with a drive surface for engagement with the article engaging surface on the wheel. The drive surface has an annular configuration with a first diameter portion that engages and drives the wheel with the wheel in its first position and a second diameter portion that engages and drives the wheel with the wheel in its second position. The second diameter portion is larger than the first so that the wheel is driven at a greater angular velocity in its second position than in its first position.

The wheel is preferably pivotable about a second axis between its first and second positions. The drive surface on the drive shaft is, in a preferred form, traced by the arc of a circle centered on the second axis. As the wheel rotates about the second axis, the speed thereof is progressively increased as it engages an increasing diameter of the drive surface.

Preferably, the drive surface has spaced ends with the same diameter and a center portion with a diameter that is less than the end diameters. The surface diameter increases progressively from the center towards each axial end of the drive surface. With this arrangement, the wheel can have three different positions: (1) a first position wherein it engages the large diameter of the drive surface at one axial end thereof and diverts articles off of one side of the conveyor at a first speed; (2) a second position wherein it advances articles in the main conveying path at a speed slower than the first speed; and (3) a third position wherein it engages the other axial end of the drive surface to divert articles off the other end of the conveyor at a speed preferably equal to the first speed.

In most systems, a plurality of wheels will be provided and are moved simultaneously so that the rotational axes of the plurality of wheels are parallel to result in simultaneously driving of articles by a plurality of wheels in the same direction.

To assure a positive drive, preferably each drive wheel is associated with first and second drive shafts, having first and second drive surfaces. The drive surfaces cooperatively bear against and drive the wheel in the same manner.

Any number and arrangement of wheels is contemplated by the invention. Individual modules defining the drive surfaces can be placed over the drive shaft to produce the desired configuration for the drive surface or the drive surface can be machined as part of a single piece shaft.

DETAILED DESCRIPTION OF THE DRAWINGS

Figure 1:
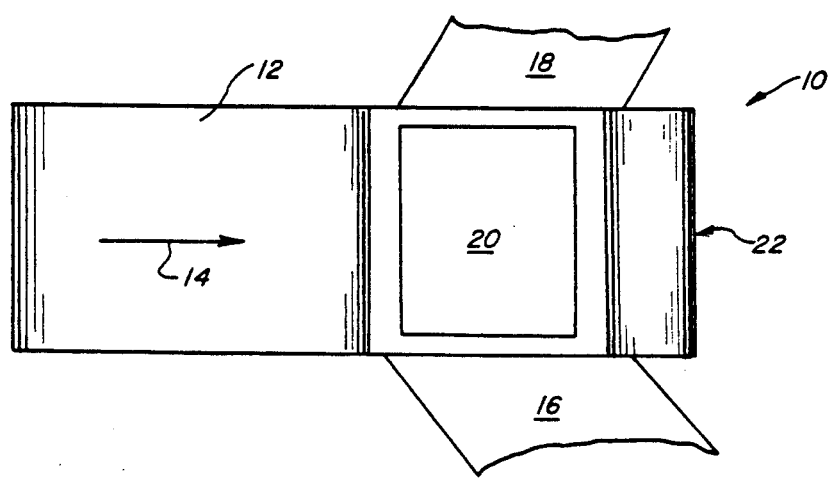
FIG. 1 is a schematic plan view of a conventional type conveyor system with an article diverting structure according to the present invention incorporated therein.
Figure 2:
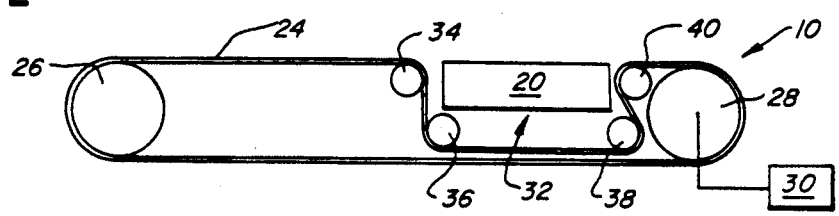
FIG. 2 is a schematic side elevation view of the conveyor system of FIG. 1.

In FIGS. 1 and 2, an exemplary conveying system, suitable for incorporation of the present invention, is shown at 10. The conveying system 10 consists of a primary conveyor 12, for advancing articles in a main conveying stream in the direction of arrow 14 in FIG. 1, i.e. left to right, and first and second secondary conveyors 16, 18, extending angularly outwardly from the primary conveyor 12. Through a diverter assembly 20, according to the present invention, articles are selectively directed: (1) in the principal conveying direction off of the primary conveyor end 22; (2) onto the secondary conveyor 16; and (3) onto the secondary conveyor 18.

The particular configuration of the primary and secondary conveyors 12, 16, 18 is not critical to the present invention. In the system shown, an endless belt 24 is trained about first and second cylindrical drums 26, 28. At least one of the drums 28 is driven by a drive 30 to advance the belt 24 in its path.

The diverting assembly 20 resides within a recess 32 in the primary conveyor 12. The recess 32 is defined by rerouting the belt 24 through, in this instance, four rollers 34, 36, 38, 40. The belt 24, from the plane of the top surface 42 thereof, is directed downwardly over roller 34, under roller 36, under roller 38 and over roller 40 to define the recess 32.

The invention contemplates that the diverting assembly 20 not only effect diversion of articles to the secondary conveyor 16, 18, but also be useable to advance conveying articles across the recess 32 in the principal conveying direction.

Preliminarily, it should be noted that the conveying system 10, with the endless belt 14, is intended to be illustrative of one type of system with which the diverter assembly 20 can be utilized. The diverter assembly 20 can be incorporated into any of a number of systems, such as that utilizing carrying tubes, as shown in U.S. Pat. No. 4,760,908 to Houghton.

Details of the diverting assembly 20 are shown in FIGS. 3-8. The diverting assembly 20 utilizes at least one, and preferably a plurality, of rotatable drive wheels 44, each having a peripheral surface 46 which engages conveying articles and advances the articles as an incident of the wheel 44 being rotated. As seen most clearly in FIGS. 3 and 5, the wheels 44 are arranged in rows A-L, with the spacing between the wheels 44 in each row and adjacent rows dictated by the size and weight of the particular articles to be conveyed. The rows A-L are equidistantly spaced in the conveying direction. Because the wheels 44 in each row operate in the same manner, description herein will be limited to one exemplary row of wheels.

The entire collection of wheels 44 is suitably mounted on a frame 50 having opposite side walls 52, 54. Each wheel 44 has an associated support at 56 consisting of an upwardly opening, U-shaped yoke 58 and a pivot shaft 60 depending from the yoke 58. The wheel 46 is rotatable relative to the yoke 58 about a horizontal axis 62. The wheel support shaft 60 is journalled for rotation in a bushing 64, within a laterally extending support strap 66 extending between the frame side walls 52, 54, for rotation about a vertical axis 68.

Each shaft 60 has an associated crank arm 70 projecting radially therefrom and following rotational movement thereof. The crank arm 70 is connected to a control bar 72 through a bolt 74 and nut 76. The connection is such that the crank arm 70 and control bar 72 are freely rotatable relative to each other about a vertical axis 78. Lateral shifting of the control bar 72 is effected by a conventional control mechanism, shown schematically at 80 in FIG. 3. Lateral shifting of the control bar 72 simultaneously effects rotation of all wheel supports 56 thereon in each row. In the embodiment shown, there are eight wheels 44 in each row that are controlled by the bar 72.

Figure 4:
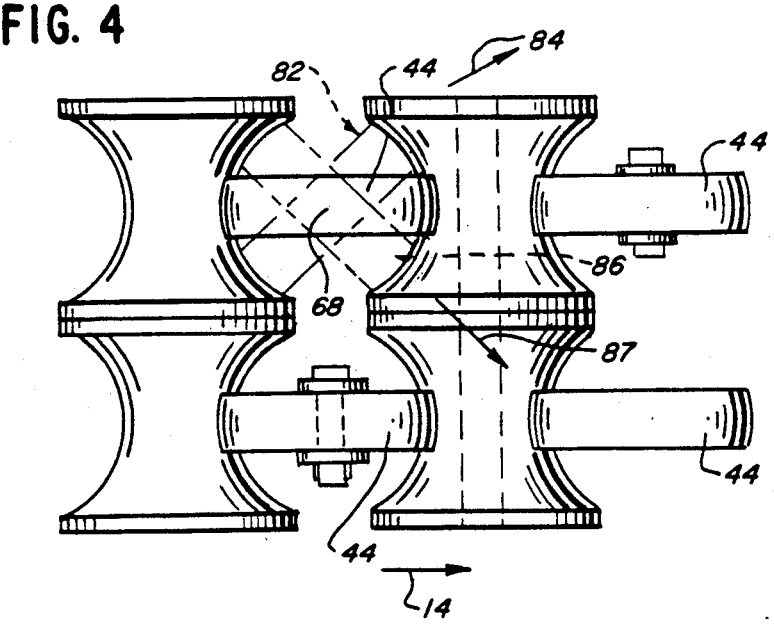
FIG. 4 is an enlarged plan view of a section of the article diverting structure of FIG. 3 showing the relationship of article engaging wheels and drive surfaces for the wheels.
Figure 5:
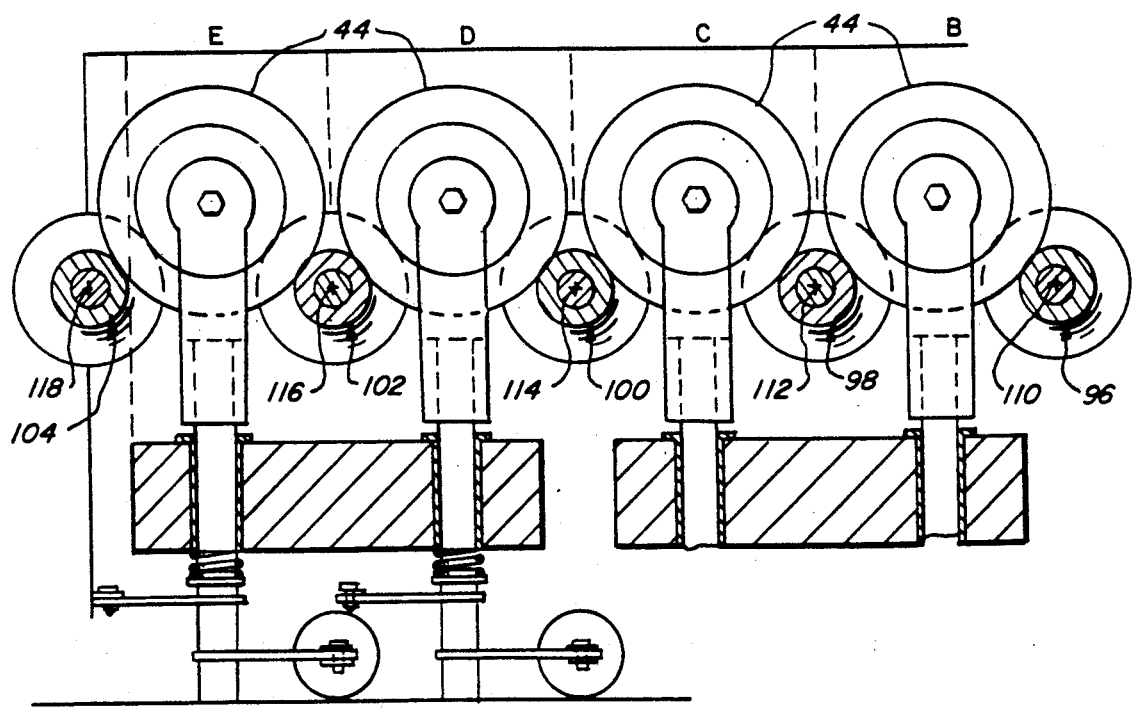
FIG. 5 is an enlarged side elevation view of a section of the article diverting structure of FIG. 3.

As seen in FIG. 4, each row of wheels 44 is arranged to be movable by lateral shifting of the control bar 72 between (1) a first position, shown in solid lines in FIG. 4, wherein articles are conveyed by the roller wheels 44 in the conveying direction 14; (2) a second position, shown in phantom at 82, wherein the wheels 44 drive articles in the direction of arrow 84 as they are operated, off of one side of the conveyor 12; and (3) a third position, shown in phantom at 86, wherein the wheel pivot axis 62 is at right angles to its orientation in the phantom position at 82, so that the wheels 44 drive the articles in the direction of arrow 87 off of the other side of the conveyor 12.

Figure 3:
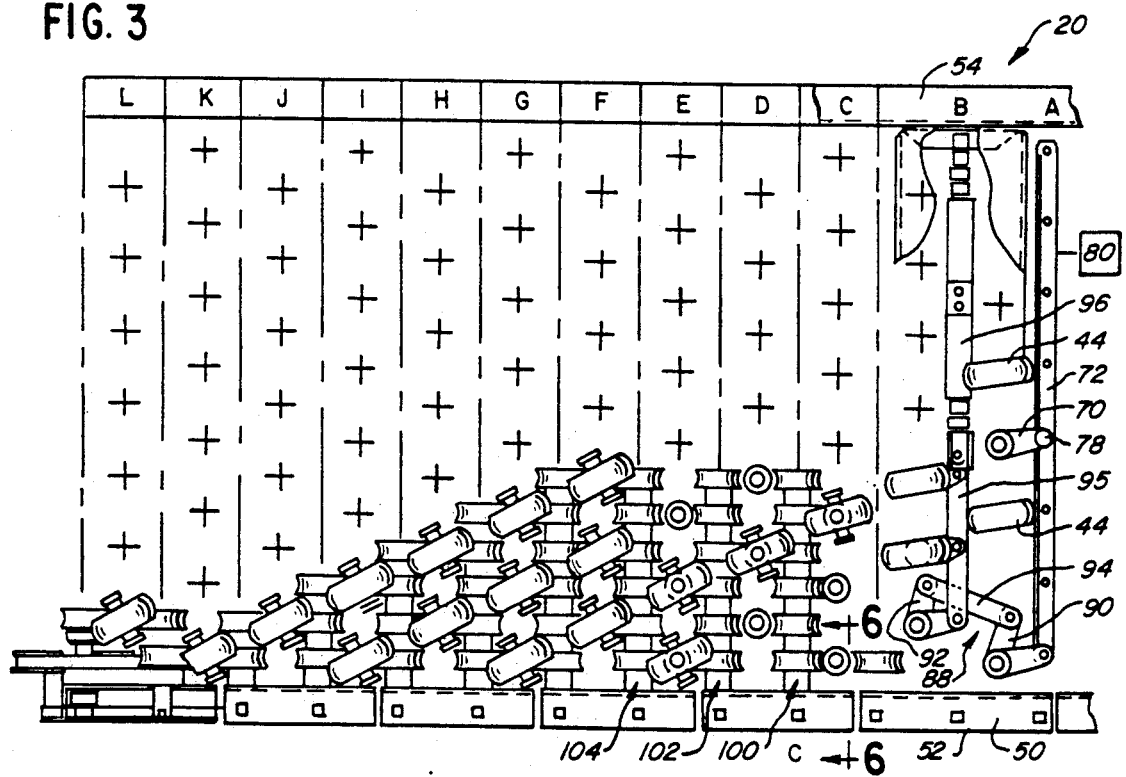
FIG. 3 is a plan view of the article diverting structure according to the present invention.

The rows of wheels 44 can each have an associated control bar 72, which is separately attached to a drive/control 80, or one or more of the control bars 72 can be interconnected as through a linkage shown at 88 in FIG. 3. An arm 90 projects radially outwardly from the pivot shaft 60 on the wheels 44 on one wheel row A and a like arm 92 projects radially outwardly from the shaft 60 on the adjacent row B. A follower link 94 interconnects the arms 90, 92 through a pivot connection so that translatory movement of the control bar 72 effects a corresponding pivoting of a control bar 95 carrying the rollers 44 in the adjacent wheel row B.

The drive wheels 44 are driven by a plurality of drive shafts 96, 98, 100, 102, 104. The shafts 96-104 are directed laterally between the frame sidewalls 52, 54 and have ends 106 (one shown for shaft 96 in FIG. 6) which are journalled for rotation in bushings 108 on the frame 50. The shafts 98-104 have parallel pivot axes 110, 112, 114, 116, 118 that are equidistantly spaced in the conveying direction.

Figure 6:
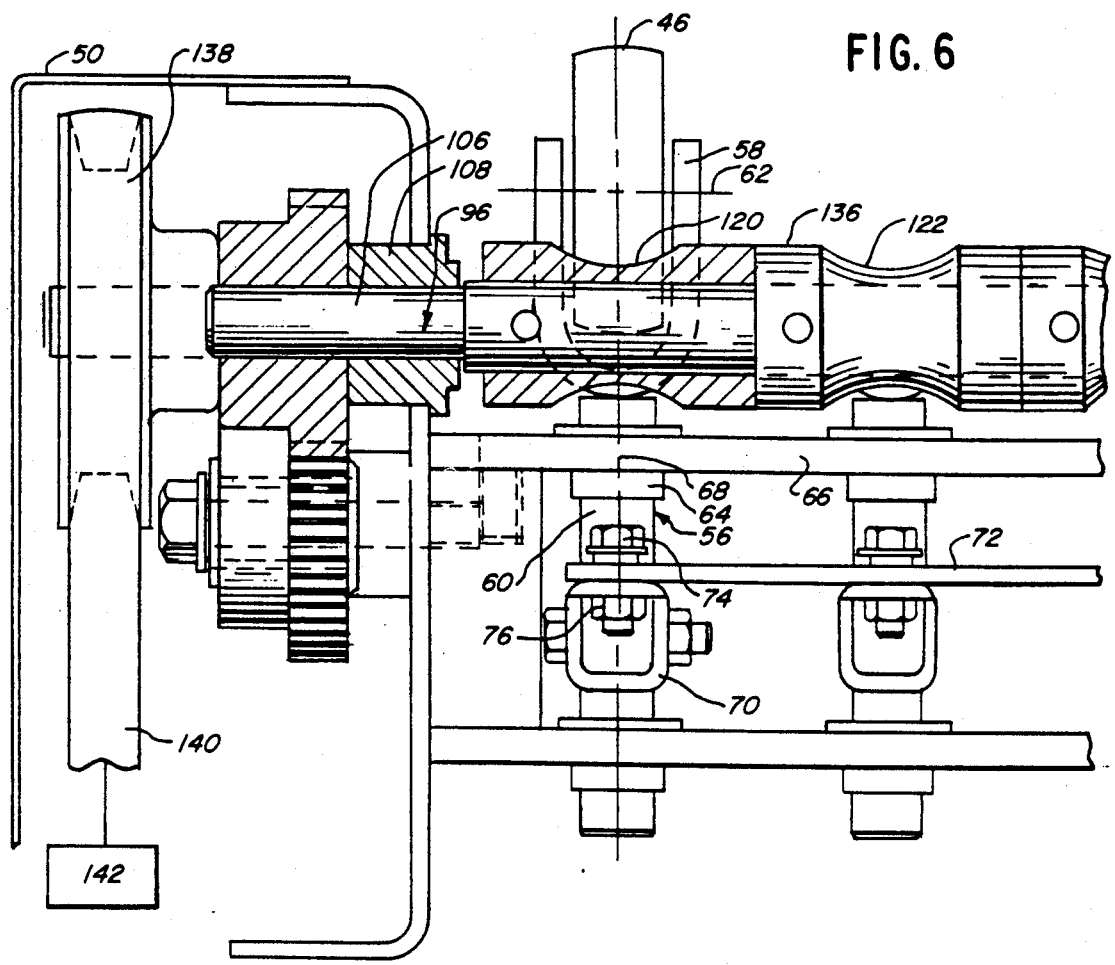
FIG. 6 is an enlarged section view of the diverting structure taken along line 6—6 of FIG. 3.
Figure 7:
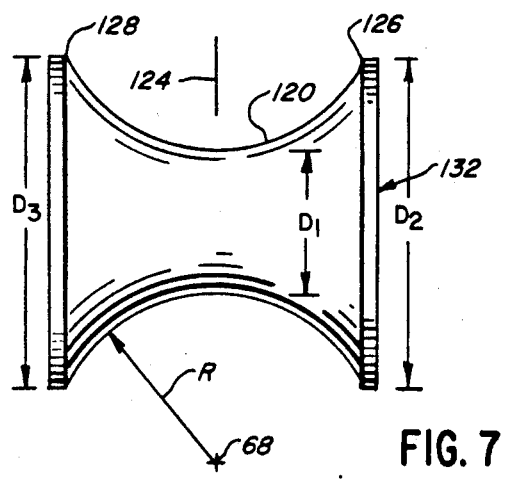
FIG. 7 is an enlarged end elevation view of a roller module defining a drive surface for a drive wheel on the article diverting structure.
Figure 8:
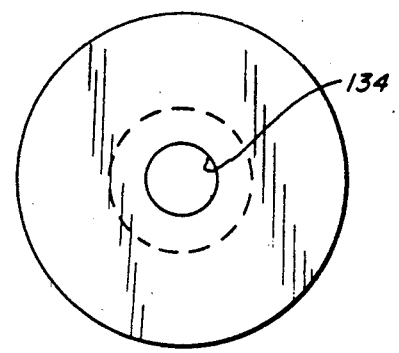
FIG. 8 is a side elevation view of the roller module of FIG. 7.

Each drive wheel 44 is arranged to be driven by two adjacent shafts 96-104, with the pivot axis 68 for the wheel support 56 residing midway between adjacent shaft axes 110-118. Each drive shaft 96-104 has drive surfaces spaced lengthwise thereof to cooperate with the wheels 44. An exemplary drive shaft 96 is shown in FIG. 6 with two such drive surfaces 120, 122, with an enlarged view of the surface 120 shown in FIG. 7. The drive surface 120 has an annular configuration and is symmetrical about a center plane 124 and has a first diameter D1 centered axially between the ends 126, 128 of the surface 120. The surface 120 increases in diameter progressively from the center plane 124 in each axially opposite direction so that the diameter D2 at the one axial end 126 is equal to the diameter D3 at the other axial end 128. The axis 68 for the wheel supports 56 is arranged so that the surface 120 is traced by the arc of a circle with a radius R centered on the axis 68. In operation, the diameter of the wheels 44 is chosen so that the surface 46 thereon engages the drive surface 120 to be thereby driven throughout the range of pivoting of the wheel support 56 about the axis 68.

It can be seen that, with the wheels aligned in the conveying direction for the primary conveyor 12, the surface 46 on the wheel 44 engages the surface 120 at its smallest diameter D1, as shown in FIG. 4 in solid line. In FIG. 4, rotation of the wheels 44 in a counterclockwise direction about the pivot axis 68, causes the wheels 44 to progressively engage an increasing diameter portion of the surface 120. As this occurs, the conveying direction for the wheels changes as does the rotational speed. The larger diameter portion of the surface 120 causes the wheels 44 to rotate at a geater velocity as they are moved away from the solid line position in FIG. 4. Rotation of the wheels 44 in a clockwise direction about the pivot axes 68 increases the rotational speed and changes the direction of conveyance for diversion of articles off of the other side of the conveyor 12.

In one design for the system, the diameters D2, D3 of the axial ends of the surface 120 and the wheel surface 46 are equal to 2¼". The radius R, for the arc centered on the pivot axis 68 for the surface 120, is equal to 1⅛". However, the invention contemplates different diameters for the wheels 44 and drive surfaces 120.

The invention also contemplates that each wheel 44 be driven by two like drive surfaces 120, spaced in a conveying direction. The relationship between each wheel 44 and the drive surfaces 120 which it cooperates with is exactly the same and assures a positive drive of the wheels 44.

It can be seen that the wheels 44 can be used to convey articles in the principal conveying direction and, by simple rotation thereof, the direction of conveyance as well as the speed of conveyance can be readily changed. There is no need to elevate the wheels 44 to effect engagement with a conveying article. The increased speed of the wheels 44 in the divert positions allows the articles to be diverted abruptly off of the main conveyor 12 without interference between the diverted articles and the conveying upstream articles. The wheels 44 are operable to effect diversion off either side of the primary conveyor 12 with the same ease.

The drive surfaces 120, 122 can be arranged along the length of the shafts 96-104 in any of a number of different ways. The shaft length can be machined as a single piece to define the surfaces 120, 122, etc. Alternatively, the drive surfaces 120, 122, etc. can be made by providing roller modules, as shown at 132 in FIG. 7. The modules each have a bore 134, which permits them to be shifted axially over the length of the shafts 96-104. A spacer 136 can be separately provided between modules 132 and/or the spacer 136 can be integrally formed with the module 132, as shown in FIG. 6.

The shafts 96-104 have sheaves 138 adjacent their ends which permit concurrent driving through a belt/chain 140, operated by a drive 142, shown schematically in FIG. 6.

The foregoing disclosure of specific embodiments is intended to be illustrative of the broad concepts comprehended by the invention.

We claim:

1. An article conveyor comprising:

a frame;

first means on said frame for conveying articles in a first path, said first conveying means having opposite sides;

a rotatable wheel mounted to the frame and having an article engaging surface which advances articles as an incident of rotation of the wheel about a first axis;

means for rotating the wheel about the first axis and having a rotatable shaft that rotates about an axis that is at substantially a right angle to the first path; and means for selectively changing the orientation of the wheel and first axis between (a) a first position wherein the axes of the shaft and rotatable wheel are substantially parallel and the rotating wheel advances articles engaged thereby in said first path and (b) a second position wherein the rotating wheel advances articles engaged thereby in a second path that is transverse to the first path to thereby divert articles off of said first conveying means.

there being means on the wheel rotating means for increasing the wheel rotational velocity as an incident of the wheel being moved to its second position from its first position.

2. The article conveyor according to claim 1 wherein with the wheel in the second position the wheel directs articles conveying in said first path towards one side of the first conveying means, and the wheel is movable to a third position wherein the wheel directs articles conveying in said first path towards the other side of the first conveying means.

3. The article conveyor according to claim 1 wherein there are a plurality of wheels in addition to the first claimed wheel, each with a surface to advance articles thereagainst as each wheel is rotated, means are provided for simultaneously rotating said plurality of wheels each about an axis, and means are provided for simultaneously moving each of the plurality of wheels between a first position wherein each wheel advances articles engaged thereby in said first path and a second wheel position where each rotating wheel advances articles engaged thereby in the second path.

4. An article conveyor comprising:

a frame;

first means on said frame for conveying articles in a first path, said first conveying means having opposite sides;

a rotatable wheel mounted to the frame and having an article engaging surface which advances articles as an incident of rotation of the wheel about a first axis;

means for rotating the wheel about the first axis; and means for selectively changing the orientation of the wheel and first axis between (a) a first position wherein the rotating wheel advances articles engaged thereby in said first path and (b) a second position wherein the rotating wheel advances articles engaged thereby in a second path that is transverse to the first path to thereby divert articles off of said first conveying means;

wherein the means for rotating the wheel includes a rotating drive shaft with a drive surface for engagement with the article engaging surface on the wheel, said drive surface having an annular configuration with a first diameter portion that engages and drives the wheel with the wheel in its first position and a second diameter portion that engages and drives the wheel with the wheel in its second position.

5. The article conveyor according to claim 4 wherein the second diameter portion is larger than the first diameter portion so that the wheel in its second position rotates faster than the wheel in its first position.

6. An article conveyor comprising:
a frame;
first means on said frame for conveying articles in a first path,
said first conveying means having opposite sides;
a rotatable wheel mounted to the frame and having an article engaging surface which advances articles as an incident of rotation of the wheel about a first axis;
means for rotating the wheel about the first axis; and
means for selectively changing the orientation of the wheel and first axis between (a) a first position wherein the rotating wheel advances articles engaged thereby in said first path and (b) a second position wherein the rotating wheel advances articles engaged thereby in a second path that is transverse to the first path to thereby divert articles off of said first conveying means;
wherein the means for rotating the wheel comprises first and second rotatable shafts with substantially parallel rotational axes and each said first and second shaft has a drive surface and the drive surfaces on the first and second shafts simultaneously engage and drive the wheel.

7. The article conveyor according to claim 6 wherein the wheel is pivotable about a second axis between its first and second positions and the drive surfaces on the first and second shafts are both traced by an arc of constant radius centered on the second axis.

8. The article conveyor according to claim 7 wherein the drive shaft axes are at right angles to the second axis.

9. An article conveyor comprising:
a frame;
a drive wheel having a peripheral article engaging surface;
a wheel support on said frame;
means for mounting the wheel to the wheel support for rotation about a first axis;
means for rotating the wheel to thereby effect advancement of articles in contact with said article engaging surface,
said rotating means comprising a rotary shaft having a shaft axis and a surface to engage the drive wheel; and
means for selectively varying the orientation of the wheel support relative to the frame to thereby vary the orientation of the first axis relative to the frame and thus the direction of advancement of articles by said rotating wheel engaging surface and vary the orientation of the first axis relative to the rotary shaft axis,
said drive wheel tracing a circular path on said rotating shaft surface as said rotary shaft drives the drive wheel, regardless of the orientation of the wheel support and drive wheel relative to the rotary shaft.

10. The article conveyor according to claim 9 wherein said rotating means includes means for varying the rotational speed of the drive wheel as an incident of the orientation of the wheel support being changed relative to the frame.

11. The article conveyor according to claim 9 wherein the varying means comprises means for rotating the support about a second axis that is perpendicular to the first axis.

12. The article conveyor according to claim 9 wherein the means for varying the wheel support orientation comprises means for rotating the wheel support about a second axis between first and second positions and the means for rotating the wheel includes means for rotating the wheel at a first rotational speed with the wheel support in its first position and at a second rotational speed that is greater than the first rotational speed with the wheel support in its second position.

13. The article conveyor according to claim 9 wherein there are a plurality of wheel supports with wheels, said plurality of wheels being rotatable about parallel axes, and the varying means includes means for simultaneously varying the orientation of the plurality of wheel supports while maintaining the wheel axes in substantially parallel relationship.

14. An article conveyor comprising:
a frame;
a drive wheel having a peripheral article engaging surface;
a wheel support on said frame;
means for mounting the wheel to the wheel support for rotation about a first axis;
means for rotating the wheel to thereby effect advancement of articles in contact with said article engaging surface; and
means for selectively varying the orientation of the wheel support relative to the frame to thereby vary the orientation of the first axis relative to the frame and thus the direction of advancement of articles by said rotating wheel engaging surface;
wherein the means for rotating the wheel comprises first and second drive shafts rotatable about parallel axes, there being drive surfaces on each of the drive shafts for simultaneously engaging the drive wheel and effecting rotation thereof.

15. An article conveyor comprising:
a frame;
a drive wheel having a peripheral article engaging surface;
a wheel support on said frame;
means for mounting the wheel to the wheel support for rotation about a first axis;
means for rotating the wheel to thereby effect advancement of articles in contact with said article engaging surface; and
means for selectively varying the orientation of the wheel support relative to the frame to thereby vary the orientation of the first axis relative to the frame and thus the direction of advancement of articles by said rotating wheel engaging surface, wherein said rotating means includes means for varying the rotational speed of the drive wheel as an incident of the orientation of the wheel support being changed relative to the frame;

wherein the means for varying the drive wheel speed comprises a drive shaft rotatable about a third axis, said drive shaft having an annular drive surface centered on said third axis and having a progressively increasing diameter over a part of the axial extent of the drive shaft, said wheel being movable upon said support being reoriented relative to the frame to bear the article engaging surface against the drive surface part selectively at different axial positions thereon, whereby the rotational drive wheel is dictated by the diameter of that portion of the drive surface part against which the wheel bears.

16. The article conveyor according to claim 15 wherein the means for varying the orientation of the wheel support comprises means for rotating the support about a second axis and the drive surface part is traced by the arc of a circle centered on said second axis.

17. An article conveyor comprising:
a frame;
first means on said frame for conveying articles in a first path;
a wheel having a peripheral article engaging surface with a top and bottom;
a wheel support mounted on the frame;
means for mounting the wheel to the wheel support for rotation about a first axis and for positioning the wheel so that the top of the article engaging surface is at a predetermined height to engage articles being conveyed in said first path;
means for rotating the wheel to thereby effect advancement of articles contacted by said article engaging surface,
said wheel rotating means comprising a drive surface that is rotatable about an axis for engaging and driving the wheel,
means for selectively varying the orientation of the wheel support without changing the height of the top of the wheel engaging surface to thereby vary the orientation of the first axis relative to the frame between (a) a first orientation and (b) a second orientation wherein articles contacting the articles engaging surface are advances in a direction transverse to said first path and said drive surface having a first diameter portion that engages the wheel with the wheel support in its first orientation and a second diameter portion that engages the wheel with the wheel support in its second orientation, said first and second diameter portions having different diameters.

18. The article conveyor according to claim 17 wherein the means for varying the orientation of the wheel support comprises means for rotating the wheel support for rotation relative to the frame about a second axis and at least part of the drive surface is traced by the arc of a circle centered on the second axis.

19. An article conveyor comprising:
a frame;
a drive wheel having a peripheral article engaging surface;
a wheel support on said frame;
means for mounting the wheel to the wheel support for rotation about a first axis;
means for rotating the wheel to thereby effect advancement of articles in contact with said article engaging surface;
said rotating means comprising a rotary shaft with an axis and having a surface to engage the drive wheel; and
means for selectively varying the orientation of the wheel support relative to the frame between first and second positions to thereby vary the orientation of the first axis relative to the frame and thus the direction of advancement of articles by said rotating wheel engaging surface,
said wheel engaging a first part of the rotating shaft surface with the wheel support in the first position and a second part of the rotating shaft surface, that is axially spaced relative to the rotating shaft surface from the first part of the rotating shaft surface, with the wheel support in its position.

20. An article conveyor comprising:
a frame;
first means on said frame for conveying articles in a first path;
a wheel having a peripheral article engaging surface with a top and bottom;
a wheel support mounted on the frame;
means for mounting the wheel to the wheel support for rotation about a first axis and for positioning the wheel so that the top of the article engaging surface is at a predetermined height to engage articles being conveyed in said first path;
means for rotating the wheel to thereby effect advancement of articles contacted by said article engaging surface; and
means for selectively varying the orientation of the wheel support to thereby vary the orientation of the first axis relative to the frame between (a) a first orientation in which articles contacting the article engaging surface are advanced in said first path and (b) a second orientation wherein articles contacting the article engaging surface are advanced in a direction transverse to said first path,
wherein the wheel rotating means has an annular configuration with a diameter that varies axially of the drive shaft.

21. The article conveyor according to claim 20 wherein the means for varying the orientation of the wheel support comprises means for rotating the wheel support for rotation relative to the frame about a second axis and at least part of the drive surface is traced by the arc of a circle centered on the second axis.

* * * * *